(12) United States Patent
Yoon et al.

(10) Patent No.: US 9,484,757 B2
(45) Date of Patent: Nov. 1, 2016

(54) CHARGING AND DISCHARGING SYSTEM

(71) Applicant: SAMSUNG SDI CO., LTD., Yongin-si, Gyeonggi-do (KR)

(72) Inventors: Hee-Youl Yoon, Yongin-si (KR); Sang-Young Jin, Yongin-si (KR); Young-Hak Pyo, Yongin-si (KR); Ji-Hoon Sim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 377 days.

(21) Appl. No.: 14/025,790

(22) Filed: Sep. 12, 2013

(65) Prior Publication Data

US 2014/0210413 A1 Jul. 31, 2014

(30) Foreign Application Priority Data

Jan. 30, 2013 (KR) ........................ 10-2013-0010704

(51) Int. Cl.
*H02J 7/00* (2006.01)
*H01M 10/42* (2006.01)
*H01M 10/6561* (2014.01)

(52) U.S. Cl.
CPC ........ *H02J 7/0045* (2013.01); *H01M 10/4285* (2013.01); *H01M 10/6561* (2015.04); *H02J 7/0022* (2013.01); *H02J 7/0042* (2013.01); *Y02T 10/7055* (2013.01)

(58) Field of Classification Search
USPC ........................................................ 320/107
See application file for complete search history.

(56) References Cited

U.S. PATENT DOCUMENTS

| | | | |
|---|---|---|---|
| 2007/0188130 A1* | 8/2007 | Scheucher | B60L 11/1861 320/110 |
| 2012/0206093 A1* | 8/2012 | Schaefer | B60L 11/1822 320/107 |
| 2012/0235645 A1 | 9/2012 | Nakashima et al. | |

FOREIGN PATENT DOCUMENTS

| | | |
|---|---|---|
| JP | 09-176484 A | 7/1997 |
| KR | 10-2008-0068305 A | 7/2008 |
| KR | 10-2012-0076756 A | 7/2012 |
| KR | 10-2012-0083355 A | 7/2012 |

* cited by examiner

*Primary Examiner* — Eric Lee
(74) *Attorney, Agent, or Firm* — Lewis Roca Rothgerber Christie LLP

(57) ABSTRACT

A charging/discharging system includes a charging/discharging power unit for applying power to a battery cell, a chamber, a jig unit for holding the battery cell mounted in the chamber, an air conditioning unit for adjusting temperature and humidity in the chamber, and an interface unit for controlling the charging/discharging power unit, and for controlling the air conditioning unit, wherein the charging/discharging power unit, the chamber, the air conditioning unit, and the interface unit are combined as an integrated structure.

13 Claims, 4 Drawing Sheets

CHARGING AND DISCHARGING SYSTEM

CROSS-REFERENCE TO RELATED APPLICATIONS

This application claims priority to, and the benefit of, Korean Patent Application No. 10-2013-0010704, filed on Jan. 30, 2013, in the Korean Intellectual Property Office, the disclosure of which is incorporated herein in its entirety by reference.

BACKGROUND

1. Field

One or more embodiments of the present invention relate to a charging/discharging system (e.g., a charging and discharging system for testing battery cells).

2. Description of the Related Art

In general, a secondary battery may be charged and discharged, and is widely used in small size mobile devices (such as smartphones, ultra-slim notebook computers, tablet personal computers, portable information devices, camcorders, videos, and digital cameras), and in large size electronic appliances (such as electric vehicles, hybrid vehicles, electric bicycles, uninterruptible power supply (UPS), and energy storage systems (ESSs)).

A small size mobile device uses a small number of battery cells. However, because a large electronic appliance requires high output and large capacity, a battery pack, in which a plurality of battery cells are electrically connected to each other, is used.

During a process of manufacturing a battery, a battery cell undergoes various tests, including a lifespan test. Thus, the battery cell may be tested stably by reducing errors generated during assembling and disassembling components/connections in the charging/discharging system.

SUMMARY

One or more embodiments of the present invention include a charging/discharging system capable of improving the reliability of a battery cell by integrating various components of a battery cell test system as an integrated structure.

Additional aspects will be set forth in part in the description that follows and, in part, will be apparent from the description, or may be learned by practice of the presented embodiments.

According to one or more embodiments of the present invention, a charging/discharging system includes a charging/discharging power unit for applying power to a battery cell, a chamber, a jig unit for holding the battery cell mounted in the chamber, an air conditioning unit for adjusting temperature and humidity in the chamber, and an interface unit for controlling the charging/discharging power unit, and for controlling the air conditioning unit, wherein the charging/discharging power unit, the chamber, the air conditioning unit, and the interface unit are combined as an integrated structure.

The charging/discharging system may further include a frame, the charging/discharging power unit may be located at a front portion of the frame, the chamber may be located at a rear portion of the frame, the air conditioning unit may be located on or under the frame, and the interface unit may be located in front of the chamber.

The charging/discharging system may further include a frame, a rack located in the frame, and at least one channel board on the rack.

The jig unit may include a jig frame, and at least one jig coupled to the jig frame and configured to be releasably attached to the battery cell.

The charging/discharging system may further include at least one channel board, and a number of the at least one jig may correspond to a number of the at least one channel board.

Each of the at least one jig may be electrically connected to each of the at least one channel board via a cable.

Each of the at least one jig may include a base plate, a side plate extending from, and perpendicular to, the base plate, a slider coupled to the base plate, configured to move linearly along a first guide on the base plate, and configured to have the battery cell mounted thereon, a probe for contacting the battery cell, and a location controller for controlling a contact point between the battery cell and the probe.

The contact point may be in a vertical direction with respect to the battery cell when mounted on the slider.

The location controller may include a variable clamp for moving the probe horizontally, and a fixed clamp coupled to a probe block on which the probe is located, coupled to the variable clamp, and configured to move the probe vertically.

The variable clamp may include a variable plate configured to move along a second guide located on the side plate, and a knob coupled to the variable plate for releasably fixing the variable plate to the side plate.

The fixed clamp may include a fixed plate located on the variable clamp to guide movement of the probe block along a third guide, and a pin unit coupled to the probe block to move the probe block vertically.

The pin unit may include a column coupled to the probe block in the vertical direction, a pin hingeably coupled to an end of the column, and configured to move the probe block by rotating, and a stopper configured to control rotation of the pin.

The location controller may include a variable clamp for moving the probe in a horizontal direction, a first fixed clamp coupled to a first probe block on which a first probe of the probe is located, coupled to the variable clamp, and configured to move the first probe vertically, and a second fixed clamp fixed to the side plate, coupled to a second probe block on which a second probe of the probe is located, and configured to move the second probe vertically.

The slider may be configured to have a battery cover, which is configured to be coupled to an outer surface of the battery cell, mounted thereon.

The battery cover may include a first cover plate and a second cover plate respectively configured to be located at opposite sides of the battery cell and to be coupled to each other, and respective lower portions of the first cover plate and the second cover plate may be configured to be mounted on the slider.

The battery cover may further include a location corrector between the first cover plate and the second cover plate on which the battery cell may be located for maintaining a consistent height of the battery cell.

The location corrector may include stepped blocks respectively located on the first cover plate and the second cover plate, and an upper surface of the stepped block may be configured to have the battery cell placed thereon.

The stepped block may have steps of different heights corresponding to the battery cell being differently sized to have the contact point consistently located regardless of a size of the battery cell.

The slider may include a first protrusion at an end of the slider, a block located on the base plate may define a coupling recess configured to receive the first protrusion, and the slider may be fixed to the base plate when the first protrusion is located in the coupling recess to be coupled to the block.

The chamber may include at least one section, and the charging/discharging system may include a door for selectively covering an opening for exposing the at least one section to an exterior of the changing/discharging system.

The interface unit may include a monitoring system and a keyboard, and the interface unit may be electrically connected to the charging/discharging power unit and to the air conditioning unit via a cable to control the charging/discharging power unit and to control the air conditioning unit.

The air conditioning unit may be configured to supply air corresponding to a selected temperature into the chamber.

The charging/discharging system may further include a chamber front panel as part of the integrated structure of the charging/discharging system.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
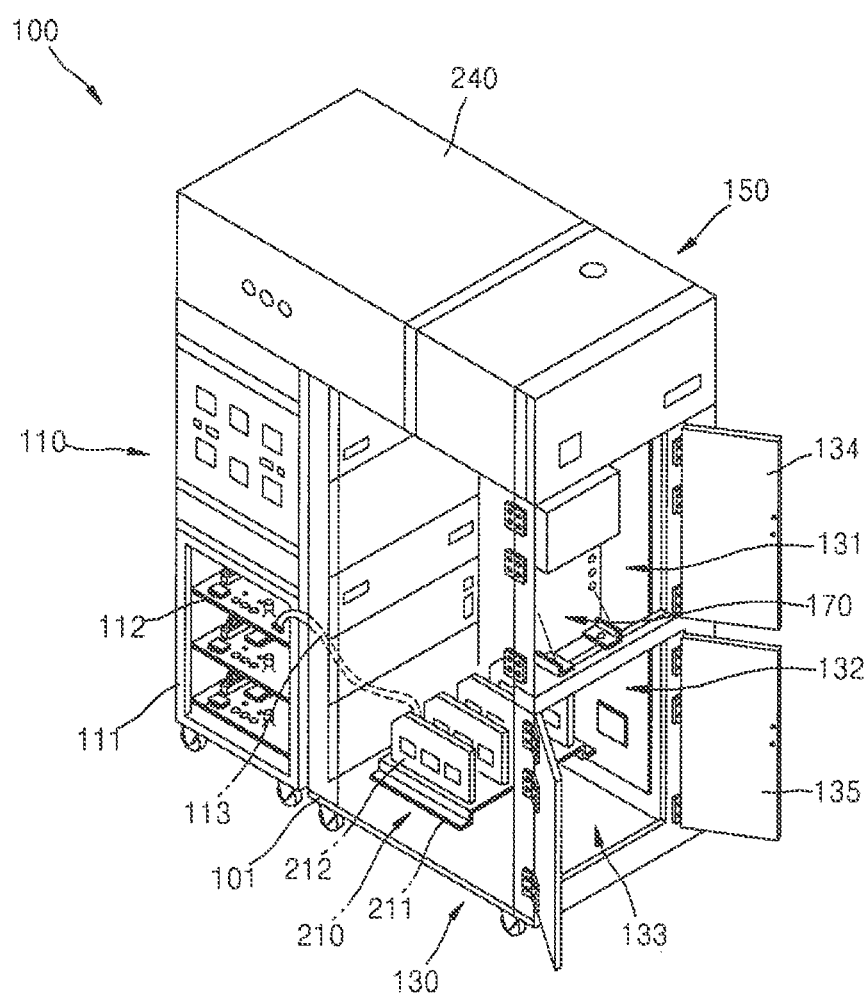
FIG. 1 is a first perspective view of a charging/discharging system according to an embodiment of the present invention.

Hereinafter, embodiments of the present invention will be described more fully with reference to the accompanying drawings, in which exemplary embodiments of the invention are shown. Embodiments of the present invention may, however, be embodied in many different forms, and should not be construed as limited to the exemplary embodiments set forth herein. Rather, these embodiments are provided so that this disclosure will be thorough and complete, and will fully convey the scope of the invention to those skilled in the art. In the drawings.

It will be understood that, although the terms first, second, third, etc., may be used herein to describe various elements, components, regions, layers and/or sections, these elements, components, regions, layers and/or sections should not be limited by these terms. These terms are intended to only distinguish one element, component, region, layer or section from another element, component, region, layer or section.

The terminology used herein is for the purpose of describing particular embodiments, and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "and/or" includes any and all combinations of one or more of the associated listed items.

Reference will now be made in detail to embodiments of the present invention, examples of which are illustrated in the accompanying drawings, wherein like reference numerals refer to like elements throughout.

Figure 2:
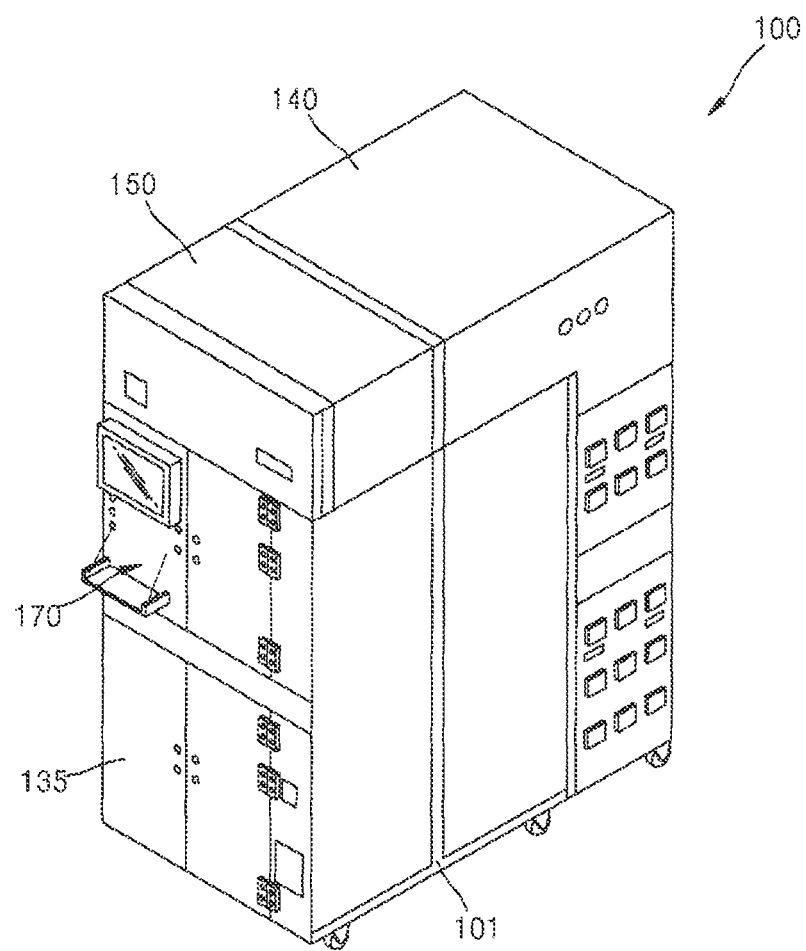
FIG. 2 is a second perspective view of the charging/discharging system of the embodiment shown in FIG. 1.

FIG. 1 is a first perspective view of a charging/discharging system 100 (e.g., a charging and discharging system) according to an embodiment of the present invention, and FIG. 2 is a second perspective view of the charging/discharging system 100 of the embodiment shown in FIG. 1.

Referring to FIGS. 1 and 2, the charging/discharging system 100 includes a charging/discharging power unit 110 (e.g., a charging and discharging power unit 110) for applying power (e.g., a predetermined charging power) to a battery cell (e.g., battery cell 190 of FIG. 3), a chamber 130 housing a jig unit 210 on which the battery cell 190 is mounted, an air conditioning unit 150 for adjusting temperature and humidity in the chamber 130, and an interface unit 170 for controlling charging and discharging by the charging/discharging power unit 110, and for controlling the temperature and the humidity in the chamber 130 by controlling the air conditioning unit 150.

The charging/discharging system 100 includes a frame 101. The frame 101 may be connected to other frames to make a box-type framework. The charging/discharging power unit 110 is located at a side of the frame 101 in a first direction (e.g., at a left side in FIG. 1), and the chamber 130 is provided at a side of the frame 101 in a second direction, which is opposite to the first direction (e.g., at a right side in FIG. 1). Likewise, the charging/discharging power unit 110 and the chamber 130 are provided on front and rear portions of the frame 101 to be adjacent each other in the charging/discharging system 100.

The air condition unit 150 is located at a side of the frame 101 in a third direction that is perpendicular to the second direction (e.g., at a top side in FIG. 1). The air conditioning unit 150 may be provided on an upper portion or a lower portion of the frame 101.

The interface unit 170 is located in front of the chamber 130 (e.g., at a right side in FIG. 1).

Further, a chamber front panel (e.g., chamber front electrical panel) 240 is located at a rear portion of the air conditioning unit 150 (e.g., to the left of the air conditioning unit 150 in FIG. 1).

As described above, the charging/discharging system 100 is formed as a structure (e.g., an integrated structure) by placing the charging/discharging power unit 110, the chamber 130, the air conditioning unit 150, the interface unit 170, and the chamber front panel 240 on a single frame 101.

The charging/discharging power unit 110 includes a plurality of racks 111. The racks 111 are a plurality of frames, or frameworks, stacked in a vertical direction on the frame 101.

At least one channel board 112 is mounted on each of the racks 111. A controller for overall control of the charging/discharging system 100, a current generating controller for control of charging and discharging the battery cell 190 mounted on the jig unit 210, and/or various electronic devices including a relay device, are mounted on the channel board 112.

A large capacity cable 113 for applying a large electrical current is provided between the charging/discharging power unit 110 and the chamber 130. Here, a final output end of the channel board 112 is electrically connected (e.g., directly connected) to a terminal of the jig unit 210 via the cable 113.

Because the charging/discharging power unit 110 and the chamber 130 are separated from each other, the cable 113 has to be at least as long as a separation distance between the channel board 112 and the chamber 130. In addition, an additional structure, such as a duct, may reduce or prevent the likelihood of the cable 113 being damaged.

However, according to the present embodiment, the charging/discharging power unit 110 and the chamber 130 form an integral structure, and a distance between the charging/discharging power unit 110 and the chamber 130 is shorter than that of the conventional art. Therefore, the cable 113 for electrically connecting the charging/discharging power unit 110 and the jig unit 210 in the chamber 130 may have a relatively short length. As described above, because the length of the cable 113 is comparatively reduced, voltage drop caused by the cable 113 may be reduced.

The chamber 130 includes at least one room/section. In the present embodiment, the chamber 130 includes an upper section (e.g., upper room/upper chamber) 131 and a lower section (e.g., lower room/lower chamber) 132 located under the upper section 131. The upper section 131 and the lower section 132 may be separated/partitioned by an additional separation wall. The chamber 130 is partitioned into the upper section 131 and the lower section 132 to contain additional jig units 210 to thereby more effectively use space of the chamber 130.

An opening 133 allowing access to at least one of the upper section 131 and the lower section 132 is provided, and an upper door 134 and a lower door 135 (e.g., one or more lower doors) for selectively sealing the opening 133 are provided at or near the opening 133. The upper door 134 and the lower door 135 may be coupled to the frame 101 by hinges. In the present embodiment, the upper door 134 is a single door 134, and the lower door 135 comprises double doors 135 that are respectively hinged at opposite sides of the opening 133/the charging/discharging system 100.

Here, the interface unit 170 is formed in the upper section 131, is coupled to the frame 101, and is formed at a remaining part of the opening 133, which is not sealed by the upper door 134. That is, when the upper door 134 is closed, an edge of the upper door 134 that is opposite a side connected to the hinges of the upper door 134 will be next to the interface unit 170.

The interface unit 170 performs the overall monitoring of the charging/discharging power unit 110 and the chamber 130 (e.g., the equipment located in the chamber 130, such as the jig unit 210). The interface unit 170 controls the charging/discharging power unit 110 and the chamber 130, and includes a monitoring system for monitoring the charging/discharging power unit 110 and the chamber 130 by using software, and a keyboard.

As described above, the charging/discharging power unit 110 and the chamber 130 (e.g., devices included in, or corresponding to, the chamber 130) are generally controlled by the interface unit 170. Accordingly, operating convenience may be improved through real-time monitoring, and thus, accidents may be avoided.

The air conditioning unit 150 is a device for introducing/blasting air (e.g., hot or cold air of a predetermined temperature) for maintaining constant temperature and constant humidity in the chamber 130. The air conditioning unit 150 is a device for cooling and heating, and thus, the air conditioning unit 150 of the present embodiment includes a general heater, a compressor, a vaporizer, a ventilator, and a fan. The air conditioning unit 150 is coupled to the chamber 130 to supply air (e.g., air of a predetermined temperature corresponding to a set temperature) to the chamber 130. The air conditioning unit 150 is electrically connected to the interface unit 170.

When the chamber front panel 240 is provided on a rear portion of the air conditioning unit 150, an installation area may be reduced or minimized. The chamber front panel 240 is a unit in which electronic components for driving the chamber 130 (e.g., devices corresponding to the chamber 130) are located, and may include a magnetic switch or various safety units. The chamber front panel 240 is electrically connected to the interface unit 170.

In addition, the jig unit 210 is provided in the chamber 130. In the present embodiment, the jig unit 210 is formed integrally with the chamber 130 (e.g., the jig unit 210 may be integrally formed with a bottom/floor defining a lower portion of the chamber 130). The jig unit 210 includes a jig frame 211, and jigs 212 coupled to the jig frame 211. The jig frame 211 is coupled to the bottom of the chamber 130. After mounting the battery cell(s) 190 on the jigs 212 according to the size of the battery cell 190, the jigs 212 are mounted on the jig frame 211.

The jig unit 210 is configured by coupling the jigs 212 to the jig frame 211, which is integrally coupled with the chamber 130, and thus, an additional current/voltage connector is not necessary. Therefore, a contact resistance is removed, and reliability of a long time test (e.g., a test for testing the life span of the battery cell 190) may be improved, as will be described in more detail below.

Figure 3:
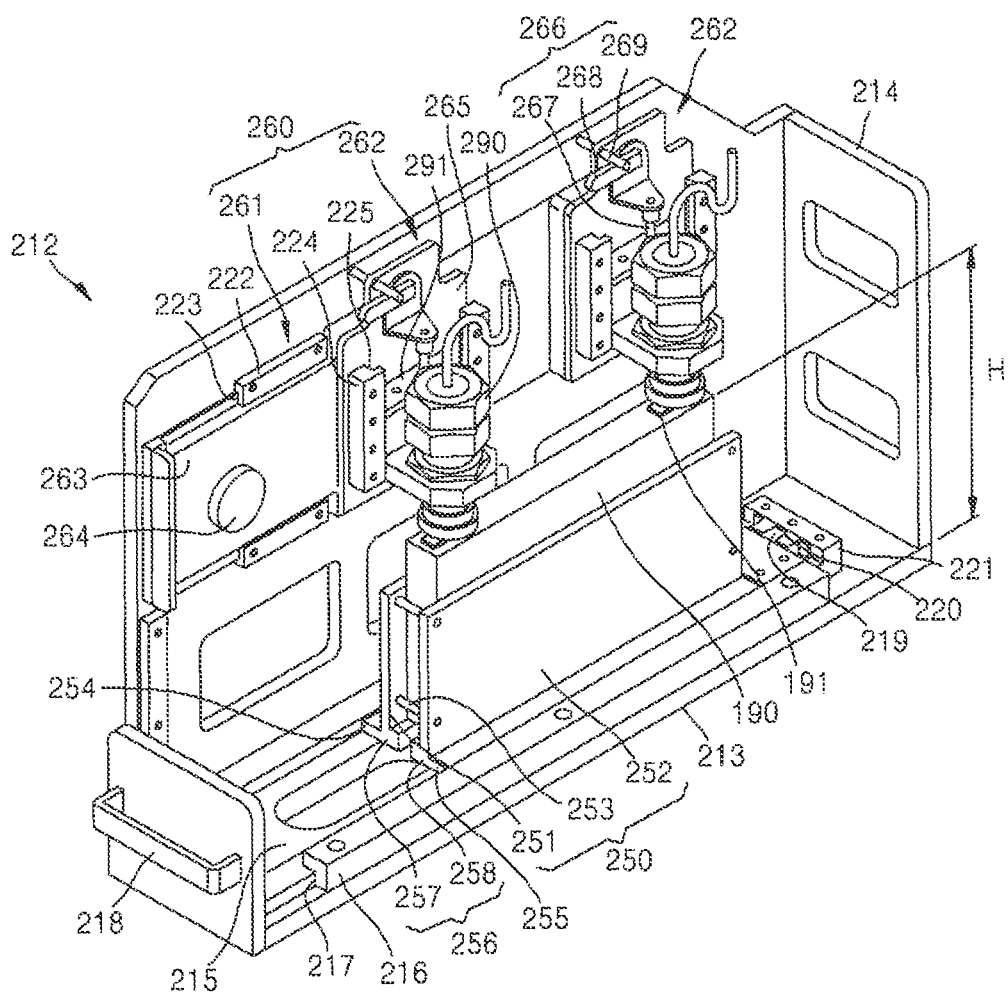
FIG. 3 is a perspective view showing a battery cell mounted on a jig, according to an embodiment of the present invention.
Figure 4:
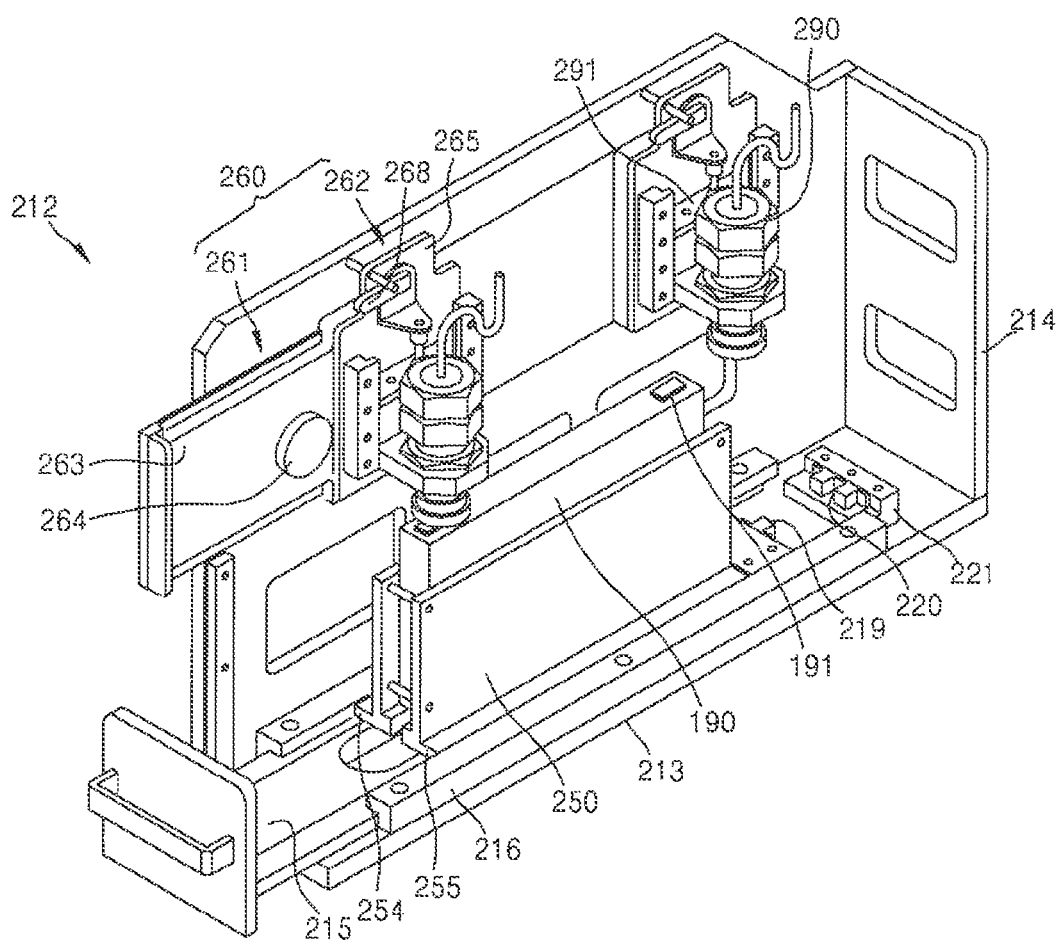
FIG. 4 is a perspective view showing a state for releasing the battery cell from the jig shown in FIG. 3.

FIG. 3 is a diagram showing the battery cell 190 mounted on the jig 212 according to the embodiment of the present invention, and FIG. 4 is a diagram showing a state of the jig 212 while releasing the battery cell 190 from the jig 212 of FIG. 3.

Referring to FIGS. 3 and 4, the jig 212 includes a base plate 213. A side plate 214 extends from at least one edge of the base plate 213 to be perpendicular to the base plate 213. The side plate 214 may include two plates that respectively extend from two adjacent edges of the base plate 213 to be perpendicular to the base plate 213. That is, the side plate 214 may comprise a first portion and an adjacent second portion that is substantially perpendicular to the first portion. The base plate 213 and the side plate 214 may be integrally formed with each other.

A pair of first guides 216 facing each other is formed on the base plate 213. The first guides 216 extend in a length direction of the base plate 213. A first guide recess 217 is formed at an inside of each of the first guides 216. Although the present embodiment uses a pair of first guides 216, other embodiments of the present invention may use a single guide.

A slider 215 is movably coupled to the first guides 216 by being inserted into the first guide recesses 217, and is able to move linearly along the first guides 216. A first knob, or handle, 218 is provided at a front portion of the slider 215 to enable the slider 215 to be pushed or pulled in a sliding direction of the slider 215.

A first protrusion 219 protrudes from a rear portion of the slider 215, shown at the right side of the slider in FIGS. 3 and 4. A first block 221 that defines a first coupling recess 220 for accommodating the first protrusion 219 is provided on the base plate 213. The first block 221 is provided on a portion of the base plate 213, the portion corresponding to a location where the first protrusion 219 is accommodated in the first coupling recess 220 after the slider 215 enters the first guide recesses 217 and is pushed along the pair of first guides 216. By placing the first protrusion 219 in the first coupling recess 220 to couple the first protrusion 219 to the first block 221, the slider 215 may be fixed/held in place on the base plate 213.

The battery cell 190 is mounted on the slider 215. The battery cell 190 is surrounded by a battery cover 250, which includes a first cover plate 251 and a second cover plate 252. That is, the first cover plate 251 is provided on a first side surface of the battery cell 190, and the second cover plate 252 is provided on a second side surface of the battery cell 190 opposite the first side surface.

The first and second cover plates 251 and 252 are coupled to each other via a connection bar 253 (e.g., one or more connection bars). While the battery cell 190 is interposed therebetween, the first and second cover plates 251 and 252 are coupled to each other by the connection bar 253.

In other embodiments of the present invention, the first cover plate 251 and the second cover plate 252 may be formed integrally with each other, that is, the present invention is not limited to the above example of the battery cover 250, provided that the battery cover 250 is able to accommodate the battery cell 190.

A first flange 254 and a second flange 255 are respectively formed on lower end portions of the first cover plate 251 and the second cover plate 252. The first and second flanges 254 and 255 may be coupled to the slider 215 via, for example, screws.

In other embodiments of the present invention, an additional block may be provided between the slider 215 and the battery cover 250. The block may include receiving recesses, which may be formed as multiple steps, so as to accommodate a lower end portion of the battery cover 250 according to a size of the battery cover 250, and thus, the battery cover 250 may be received in a receiving recess of the additional block having a size corresponding to the battery cover 250.

Accordingly, as described above, the battery cell 190 coupled to the battery cover 250 may be directly fixed on the slider 215, or may be indirectly fixed on the slider 215 via an additional block.

In the present embodiment, a location corrector 256 is formed on the battery cover 250 so as to maintain a consistent height of the battery cell 190 (e.g., different battery covers 250 having different location correctors 256 may be used for differently sized battery cells 190 to ensure a height of the differently sized battery cells 190 is relatively consistent regardless of the size of the battery cell 190).

The location corrector 256 includes a first stepped block 257 and a second stepped block 258 that are respectively formed on facing/inner surfaces of the first cover plate 251 and the second cover plate 252. The first stepped block 257 protrudes from an inner surface of the first cover plate 251, and the second stepped block 258 protrudes from an inner surface of the second cover plate 252. The battery cell 190 is mounted on an upper surface of the first stepped block 257 and an upper surface of the second stepped block 258. In other embodiments of the present invention, a stepped block may protrude from an inner surface of either only the first cover plate 251 or only the second cover plate 252 so that the battery cell 190 may be mounted thereon.

The location corrector 256 is formed on the battery cover 250, and is configured to vary a height of the battery cover 250 (in correspondence with the battery cells 190 having different sizes) to maintain the height H of the battery cell 190 as consistent, and to maintain a consistent location for contact of the terminal(s) 191 of the battery cell 190 to a probe 290 (e.g., a corresponding plurality of probes).

For example, if the battery cell 190 has a relatively small size, the location corrector 256 formed on the battery cover 250 may be formed to be relatively large (e.g., to boost the base of the battery cell 190). In addition, if the battery cell 190 has a large size, the location corrector 256 may be formed to be relatively small. Thus, a plurality of terminals 191 at an upper surface of the battery cell 190 may contact the probe 290 at a constant, or consistent, height.

As described above, because the battery cover 250 having the location corrector 256 of different heights may be selectively used according to the size of the battery cell 190, the contact location (e.g., the location where the terminals 191 contact the probe 290) may be consistent without regard to the size of the battery cell 190. That is, although the battery cell 190 may be of different sizes, the probe 290 may still contact the terminals 191 at a common location regardless of the size of the battery cell 190.

Alternately, an additional stepped block is located between the first cover plate 251 and the second cover plate 252, and then, the battery cell 190 may be mounted on the stepped block. Thus, the present invention is not limited to the above example of the location corrector 256, provided that the height H of the battery cell (e.g., differently-sized battery cells) 190 may be maintained constantly.

A plurality of terminals 191 having different polarities from each other protrude from an upper surface of the battery cell 190. The probe 290 contacts the terminals 191. The probe 290 is electrically connected to the charging/discharging power unit 110. Accordingly, the interface unit 170 may control the charging/discharging power unit 110, and a current (e.g., a predetermined charging/discharging current) may be applied from the charging/discharging power unit 110 to the battery cell 190 via the probe 290.

A location controller 260 that controls a contact location between the battery cell 190 and the probe 290 is provided on the side plate 214. The location controller 260 enables the terminals 191 of the battery cell 190 and the probe 290 to contact each other in a vertical direction.

The location controller 260 includes a variable clamp 261 and a fixed clamp 262 coupled to the variable clamp 261. The variable clamp 261 is provided to move the probe 290 in a horizontal direction (e.g., in the sliding direction of the slider 215), and the fixed clamp 262 is provided to move the probe 290 in a vertical direction.

The variable clamp 261 includes a variable plate 263 provided on the side plate 214. A second guide 222 is formed on the side plate 214, and extends in a length direction of the side plate 214, and the second guide 222 and the side plate 214 face each other. The variable plate 263 may move linearly along a second guide recess 223 defined by the second guide 222.

A second knob 264 is provided on the variable plate 263. The second knob 264 may be coupled to the variable plate 263 using a screw. The second knob 264 fixes/releases the variable plate 263 to/from the side plate 214 by being rotated (e.g., by rotating in a predetermined direction).

The fixed clamp 262 is coupled to the variable clamp 261.

The fixed clamp 262 includes a fixed plate 265 that is fixed on the variable plate 263. A third guide 224 is provided on the fixed plate 265, and extends in a longitudinal/vertical direction of the fixed plate 265, and the third guide 225 and the fixed plate 265 face each other.

A probe block 291 on which the probe 290 is located is coupled to a third guide recess 225 formed in, or defined by, the third guide 224. The probe 290 is connected to the probe block 291. The probe block 291 may move linearly in a vertical direction along the third guide recess 225.

A pin unit 266 is coupled to the probe block 291.

The pin unit 266 includes a column 267 coupled to an upper surface of the probe block 291. A pin 268 is coupled to an upper end portion of the column 267, and is coupled to the fixed plate 265 as a hinge.

Accordingly, when the pin 268 rotates in a first direction, the column 267 and the probe block 291 descend downward, and when the pin 268 rotates in a direction opposite to the first direction, the column 267 and the probe block 291 may be elevated upward. In the present embodiment, the pin unit 266 may be designed so that the probe 290 may have a range of motion to allow the probe 290 to be moved a desired distance.

A stopper 269 may be provided on a rotating range of the pin 268 to control movement of the pin (e.g., prevent an inverse movement of the pin 268).

In the present embodiment, one fixed clamp 262 is coupled on the variable clamp 261, and another fixed clamp 262 is fixed on the side plate 214, to enable the two fixed clamps 262 to move relative to each other. According to the above structure, contact location error between the plurality of terminals 191 and respective ones of the plurality of probes 290 may be reduced. For example, the battery cell 190 may be mounted on the slider 215 via the battery cover 250. By sliding the slider 215, the rightmost/rear most terminal 191 of the battery cell 190 can be aligned with the fixed clamp 262 that is fixed to the side plate 214. Then, the fixed clamp 262 may be operated to lower the probe 290 to contact the terminal 191, as described above.

In other embodiments of the present invention, the two fixed clamps 262 may be coupled onto the variable clamp 261 to move together in the horizontal and vertical directions.

Meanwhile, the jig 212 having the above structure is mounted on each of the jig frames 211 (refer to FIG. 1), and the number of jigs 212 corresponds to the number of channel boards 112 (refer to FIG. 1) provided in the charging/discharging power unit 110. In addition, each of the jigs 212 is electrically connected to each of the channel boards 112 via the cable 113 (refer to FIG. 1).

Processes of connecting the battery cell 190 to the probe 290 (e.g., to the pin 268) by using the jigs 212 having the above structure will be described below.

First, the battery cell 190 to the probe 290 and the battery cover 250 are assembled/coupled with each other. The first cover plate 251 and the second cover plate 252 are located at respective sides of the battery cell 190 to the probe 290, and are then coupled to each other using the connection bar 253.

Next, the slider 215 located on the base plate 213 is moved away from (pulled in a direction away from) the base plate 213 by pulling the first knob/handle 218. Then, the battery cover 250 and battery cell 190 are located on the base plate 213. Here, because the first flange 254 and the second flange 255 are respectively formed on the lower portions of the first cover plate 251 and the second cover plate 252, the first and second cover plates 251 and 252 may be fixed on the slider 215 via screws.

Next, by pushing the first knob/handle 218, the slider 215 located on the base plate 213 is moved toward (e.g., pushed in a direction toward) the base plate 213. When the slider 215 slides along the first guide recess 217 to a desired location on the base plate 213, the first protrusion 219 provided at the end portion of the slider 215 is inserted into the first coupling recess 220 of the first block 221 to be coupled to the first block 221 that is located at an edge of the base plate 213. Accordingly, the slider 215 may be precisely/accurately located on the base plate 213 while the battery cell 190 surrounded by the battery cover 250 is mounted thereon.

Next, by moving the variable clamp 261 and the fixed clamp(s) 262 in the horizontal and vertical directions, the probes 290 can be moved to contact the terminals 191 of the battery cell 190.

The second knob 264 may be, or may have already been, rotated in a direction so that the variable plate 263 may be released from the side plate 214, so that it may move with respect to the side plate 214. Locations of the probes 290 with respect to the terminals 191 are aligned in the horizontal/sliding direction by moving the variable plate 263 to the left or right along the second guide recess 223. When the locations of the probes 290 are aligned in the horizontal/sliding direction, the second knob 264 is rotated in a different direction to fix the variable plate 263 to the side plate 214.

Next, the pin, or pins, 268 provided on the upper portion of the fixed plate 265 is rotated in a direction. Due to the rotation of the pin 268 that is hinge-coupled to the fixed plate 265, the column 267, which has a first end coupled to the pin 268, is lowered.

When the column 267 descends, the probe block 291 coupled to a second end of the column 267 is lowered along the third guide recess 225. Accordingly, the probes 290 connected to the probe blocks 291 may make contact to the terminals 191 of the battery cell 190.

Other embodiments of the present invention may include another fixed clamp 262 (e.g., a second fixed clamp 262) that is not coupled to the variable clamp 261, but is instead fixed to the side plate 214, the contact points between the terminals 191 of the battery cell 190 and the probes 290 may be maintained by rotating the pin(s) 268, because the battery cell 190 maintains the height consistently, and the range of motion of the second fixed clamp 262 is the same as that of the fixed clamp 262 that is fixed to the variable clamp 261.

As described above, according to the charging/discharging system of the embodiments of the present invention, the components of the charging/discharging system may be an integrated structure, and thus, reliability in a lifespan test of the battery cell(s), or a unit capacity test of the battery cell(s), may be improved.

Also, space needed to operate the charging/discharging system may be reduced.

In addition, operation loads may be reduced, and accordingly, the charging/discharging system may be maintained effectively.

It should be understood that the exemplary embodiments described herein should be considered in a descriptive sense only, and not for purposes of limitation. Descriptions of aspects of the described embodiments should typically be considered as available for other similar aspects in other embodiments. Further, it should be understood that the invention is not limited to the disclosed embodiments, but, on the contrary, is intended to cover various modifications and equivalent arrangements included within the spirit and scope of the appended claims, and equivalents thereof.

What is claimed is:
1. A charging/discharging system comprising:
  a charging/discharging power unit for applying power to a battery cell;
  a chamber;
  a jig unit for holding the battery cell mounted in the chamber and comprising:
    a jig frame; and at least one jig coupled to the jig frame and configured to be releasably attached to the battery cell;

an air conditioning unit for adjusting temperature and humidity in the chamber; and an interface unit for controlling the charging/discharging power unit, and for controlling the air conditioning unit, wherein the charging/discharging power unit, the chamber, the air conditioning unit, and the interface unit are combined as an integrated structure, and wherein each of the at least one jig comprises:

a base plate;

a side plate extending from, and perpendicular to, the base plate;

a slider coupled to the base plate, configured to move linearly along a first guide on the base plate, and configured to have the battery cell mounted thereon;

a probe for contacting the battery cell; and a location controller for controlling a contact point between the battery cell and the probe.

2. The charging/discharging system of claim 1, wherein the contact point is in a vertical direction with respect to the battery cell when mounted on the slider.

3. The charging/discharging system of claim 2, wherein the location controller comprises:

a variable clamp for moving the probe horizontally; and a fixed clamp coupled to a probe block on which the probe is located, coupled to the variable clamp, and configured to move the probe vertically.

4. The charging/discharging system of claim 3, wherein the variable clamp comprises:

a variable plate configured to move along a second guide located on the side plate; and a knob coupled to the variable plate for releasably fixing the variable plate to the side plate.

5. The charging/discharging system of claim 3, wherein the fixed clamp comprises:

a fixed plate located on the variable clamp to guide movement of the probe block along a third guide; and a pin unit coupled to the probe block to move the probe block vertically.

6. The charging/discharging system of claim 5, wherein the pin unit comprises:

a column coupled to the probe block in the vertical direction;

a pin hingably coupled to an end of the column, and configured to move the probe block by rotating; and a stopper configured to control rotation of the pin.

7. The charging/discharging system of claim 2, wherein the location controller comprises:

a variable clamp for moving the probe in a horizontal direction;

a first fixed clamp coupled to a first probe block on which a first probe of the probe is located, coupled to the variable clamp, and configured to move the first probe vertically; and a second fixed clamp fixed to the side plate, coupled to a second probe block on which a second probe of the probe is located, and configured to move the second probe vertically.

8. The charging/discharging system of claim 1, wherein the slider is configured to have a battery cover, which is configured to be coupled to an outer surface of the battery cell, mounted thereon.

9. The charging/discharging system of claim 8, wherein the battery cover comprises a first cover plate and a second cover plate respectively configured to be located at opposite sides of the battery cell and to be coupled to each other, and wherein respective lower portions of the first cover plate and the second cover plate are configured to be mounted on the slider.

10. The charging/discharging system of claim 9, wherein the battery cover further comprises a location corrector between the first cover plate and the second cover plate on which the battery cell may be located for maintaining a consistent height of the battery cell.

11. The charging/discharging system of claim 10, wherein the location corrector comprises stepped blocks respectively located on the first cover plate and the second cover plate, and wherein an upper surface of the stepped block is configured to have the battery cell placed thereon.

12. The charging/discharging system of claim 11, wherein the stepped block has steps of different heights corresponding to the battery cell being differently sized to have the contact point consistently located regardless of a size of the battery cell.

13. The charging/discharging system of claim 1, wherein the slider comprises a first protrusion at an end of the slider, wherein a block located on the base plate defines a coupling recess configured to receive the first protrusion, and wherein the slider is fixed to the base plate when the first protrusion is located in the coupling recess to be coupled to the block.

* * * * *